(12) United States Patent
Yasuda et al.

(10) Patent No.: US 7,690,046 B2
(45) Date of Patent: Mar. 30, 2010

(54) DRIVE STAGE FOR SCANNING PROBE APPARATUS, AND SCANNING PROBE APPARATUS

(75) Inventors: Susumu Yasuda, Tsukuba (JP); Junichi Seki, Yokohama (JP); Takao Kusaka, Yokohama (JP); Nobuki Yoshimatsu, Cambridge (GB)

(73) Assignee: Canon Kabushiki Kaisha, Tokyo (JP)

( * ) Notice: Subject to any disclaimer, the term of this patent is extended or adjusted under 35 U.S.C. 154(b) by 300 days.

(21) Appl. No.: 11/747,581

(22) Filed: May 11, 2007

(65) Prior Publication Data

US 2007/0267580 A1 Nov. 22, 2007

(30) Foreign Application Priority Data

May 17, 2006 (JP) ............................. 2006-137309
Feb. 20, 2007 (JP) ............................. 2007-038885

(51) Int. Cl.
| | |
|---|---|
| *G01N 13/10* | (2006.01) |
| *G01N 13/16* | (2006.01) |
| *G01N 23/00* | (2006.01) |
| *G21K 5/10* | (2006.01) |
| *G21K 7/00* | (2006.01) |
| *H01L 41/00* | (2006.01) |
| *H02N 2/00* | (2006.01) |

(52) U.S. Cl. ............. 850/4; 850/3; 850/54; 310/316.01
(58) Field of Classification Search .................. 250/306, 250/307, 440.11, 442.11; 310/316.01; 850/1, 850/3, 4, 8, 18, 52, 54, 63
See application file for complete search history.

(56) References Cited

U.S. PATENT DOCUMENTS

| | | | | |
|---|---|---|---|---|
| 4,814,622 A | * | 3/1989 | Gregory et al. | ............... 850/18 |
| 5,479,013 A | * | 12/1995 | Forster et al. | .................. 850/3 |
| 5,543,614 A | * | 8/1996 | Miyamoto et al. | ............. 850/3 |

(Continued)

FOREIGN PATENT DOCUMENTS

JP 2000-88983 A 3/2000

(Continued)

OTHER PUBLICATIONS

English translation of Office Action, dated Apr. 17, 2008, in JP 2007-038885.

*Primary Examiner*—Jack I Berman
*Assistant Examiner*—Brooke Purinton
(74) *Attorney, Agent, or Firm*—Fitzpatrick, Cella, Harper & Scinto

(57) ABSTRACT

A drive stage for a scanning probe apparatus includes a supporting member, a plurality of movable portions fixed to the supporting member, and a plurality of drive elements configured and positioned to drive the plurality of movable portions. The drive stage is driven in a direction in which inertial forces of the plurality of movable portions are mutually canceled during drive of the plurality of drive elements. The drive stage further includes an inertial force difference detection member configured and positioned to detect a difference in inertial force between the plurality of movable portions, and an inertial force adjustment member configured and positioned to effect inertial force adjustment so that the difference in inertial force between the plurality of movable portions is decreased on the basis of a detection output of the inertial force detection member.

5 Claims, 11 Drawing Sheets

U.S. PATENT DOCUMENTS

| | | | |
|---|---|---|---|
| 5,751,684 A | | 5/1998 | Takeda et al. |
| 5,821,666 A | * | 10/1998 | Matsumoto et al. .... 310/316.01 |
| 6,078,044 A | * | 6/2000 | Yasutake et al. ................ 850/3 |
| 6,257,053 B1 | * | 7/2001 | Tomita et al. ................... 850/3 |
| 6,459,088 B1 | * | 10/2002 | Yasuda et al. .......... 250/442.11 |
| 6,707,230 B2 | * | 3/2004 | Smith et al. ............ 310/316.01 |
| 6,861,649 B2 | * | 3/2005 | Massie ........................ 850/54 |
| 7,278,298 B2 | * | 10/2007 | Hansma et al. ................ 73/105 |
| 7,375,911 B1 | * | 5/2008 | Li et al. ......................... 360/75 |
| 2003/0089162 A1 | * | 5/2003 | Samsavar et al. ............. 73/105 |
| 2005/0219302 A1 | * | 10/2005 | Vogeley ........................ 347/19 |
| 2007/0187593 A1 | | 8/2007 | Yasuda et al. |
| 2007/0187594 A1 | | 8/2007 | Kusaka et al. |
| 2007/0285078 A1 | | 12/2007 | Kusaka |
| 2009/0230320 A1 | * | 9/2009 | Kusaka et al. ................. 850/18 |

FOREIGN PATENT DOCUMENTS

| | | |
|---|---|---|
| JP | 2004-163217 A | 6/2004 |
| JP | 2004-333350 A | 11/2004 |
| WO | 91/15333 A2 | 10/1991 |

* cited by examiner

DRIVE STAGE FOR SCANNING PROBE APPARATUS, AND SCANNING PROBE APPARATUS

FIELD OF THE INVENTION AND RELATED ART

The present invention relates to a drive stage for a scanning probe apparatus ordinarily utilizing a scanning probe microscope (SPM), and the scanning probe apparatus.

Particularly, the present invention relates to a drive stage for a scanning probe apparatus for obtaining information of a sample, recording information in the sample, or processing the sample with relative movement between a probe and the sample.

In recent years, a scanning tunneling microscope (STM) capable of observing a surface of an electroconductive substance with resolution of nanometer or below has been developed. Further, an atomic force microscope (AFM) or the like capable of observing a surface of an insulating substance or the like with resolution similar to that of the STM has also been developed.

As a further developed type thereof, a scanning near-field optical microscope (SNOM) or the like for observing a surface state of a sample by utilizing evanescent light leaking from a minute opening at a sharp tip of a probe has been developed. In addition, a (scanning) magnetic force microscope (MFM), a scanning capacitance microscope (SCaM), a scanning thermal microscope (SThM), and the like have also been developed.

As described above, microscopes capable of measuring various physical amounts at the surfaces of the above described samples with high resolution by effecting scanning with respect to a probe or a sample have been currently developed. These microscopes are inclusively referred to as a scanning probe microscope (SPM).

In these SPMs, the probe is driven relative to a surface of the sample or a surface of a medium by a drive stage to detect a physical interaction between the probe and the sample, so that an image is obtained or record reproduction or the like of information is effected. In this case, in order to detect the physical interaction with high accuracy, it is required that an occurrence of vibration due to the drive by the drive stage is suppressed.

In order to suppress the occurrence of vibration, Japanese Laid-Open Patent Application (JP-A) 2000-088983 has proposed a drive stage constituted so that an actuator is driven so as to mutually cancel inertial forces caused with respect to a plurality of movable portions. As shown in FIG. 11, this drive stage includes a supporting member 301. Inside the supporting member 301, movable tables 302 and 303 are supported by four parallel hinge springs 304 and four parallel hinge springs 305, respectively, so as to be movable in a horizontal direction. Further, each of piezoelectric elements 306 and 307 is connected to the supporting member 301 at one end and connected to the movable table 302 or 303 at the other end. These two piezoelectric elements 306 and 307 have been subjected to polarization so that a length of each piezoelectric element is extended in a longitudinal direction of the supporting member 301 under application of a voltage. A drive signal is amplified by amplifiers 310 and 311 and applied to the piezoelectric elements 306 and 307. The amplifiers 310 and 311 have signal amplification factors A1 and A2, respectively, set so that inertial forces during the drive of the movable tables 302 and 303 have values which are identical to each other in terms of an absolute value but are different in direction. More specifically, when the movable tables 302 and 303 have masses m1 and m2 and drive acceleration a1 and a2, setting is made to provide $m1 \times a1 = m2 \times a2$. Further, in the case where frequency characteristics during the drive of the movable tables 302 and 303 are different from each other, the amplification factors can be set depending on the frequency characteristics. By controlling an amplification factor depending on a mass of an object to be mounted on the movable table, it is possible to prevent the occurrence of vibration regardless of the mass of the object to be mounted on the movable table.

In FIG. 11, the two movable tables to be driven are shown but either one or both of the movable tables may be used as a sample table for mounting a sample thereon. In the above constituted drive stage, when the drive signal is inputted, the movable tables 302 and 303 are driven so that inertial forces caused with respect to the movable tables 302 and 303 have an identical value in a direction in which the movable tables 302 and 303 face each other. As a result, the inertial forces transmitted to the supporting member 301 are mutually canceled. Therefore, it is possible to provide a drive stage with less occurrence of vibration even when high-speed scanning is effected.

International Patent Publication No. WO 91/15333 has proposed a positioning stage of an ultrahigh-speed electrodynamics type utilizing an electromagnetic force.

However, in the above described conventional drive stages, there arises a difference in inertial force between the plurality of movable tables as movable portions in the case where measurement is made by changing the sample to be mounted on the movable table or in the case where a characteristic of the piezoelectric element is changed with time. In these cases, the inertial forces cannot be mutually canceled, so that a resultant effect is not necessarily satisfactory. That is, in the conventional drive stages, the occurrence of vibration is alleviated by driving drive elements so that inertial forces of the respective movable tables are mutually canceled. In other words, in order to prevent the occurrence of vibration, it is necessary to drive the drive elements so that the inertial forces of the movable tables are equal to each other.

In the conventional drive stages, e.g., when a sample mounted on one of two movable tables shown in FIG. 6 is replaced, a mass relationship between the two movable tables is changed in some cases. In such cases, even when inertial forces of the movable tables before the sample is replaced are set to be equal to each other, a balance between the inertial forces to be canceled is disturbed by the change in the mass relationship. For this reason, there arises such a case that the equal inertial forces cannot be mutually canceled. This phenomenon is also caused by a change in characteristic of piezoelectric elements or the like.

Further, the above described positioning stage of the ultrahigh-speed electrodynamics type utilizing the electromagnetic force has a movable portion floated from a frame.

SUMMARY OF THE INVENTION

A principal object of the present invention is to provide a drive stage for a smaller-size scanning probe apparatus capable of alleviating an occurrence of vibration without being adversely affected by a change in mass of a movable portion, a change in characteristic of a drive element, etc.

Another object of the present invention is to provide a scanning probe apparatus including the drive stage.

According to an aspect of the present invention, there is provided a drive stage for a scanning probe apparatus, comprising:

a supporting member;

a plurality of movable portions fixed to the supporting member;

a plurality of drive elements configured and positioned to drive the plurality of movable portions;

wherein the drive stage is driven in a direction in which inertial forces of the plurality of movable portions are mutually canceled during drive of the plurality of drive elements, an inertial force difference detecting device configured and positioned to detect a difference in inertial force between the plurality of movable portions; and an inertial force adjusting device configured and positioned to effect inertial force adjustment so that the difference in inertial force between the plurality of movable portions is decreased on the basis of a detection output of the inertial force detecting device.

In this drive stage, the inertial force adjusting device may preferably be capable of adjusting amplification factors of drive signals for driving the plurality of movable portions depending on the difference in inertial force between the plurality of movable portions. Further, each of the drive elements may preferably comprise an electromechanical transducer, such as a piezoelectric element of a stack type or a cylindrical type. The electromechanical transducers may preferably comprise a first cylindrical piezoelectric element and a second cylindrical piezoelectric element which is concentrically disposed inside the first cylindrical piezoelectric element.

In the above described drive stage of the present invention, the inertial force difference detecting device may preferably be a triaxial acceleration sensor provided to the supporting member.

According to another aspect of the present invention, there is provided a drive stage for a scanning probe apparatus, comprising:

a supporting member;

a plurality of movable portions fixed to the supporting member;

a plurality of drive elements configured and positioned to drive the plurality of movable portions;

wherein the drive stage is driven in a direction in which inertial forces of the plurality of movable portions are mutually canceled during drive of the plurality of drive elements, an inertial force adjusting device configured and positioned to detect a difference in inertial force between the plurality of movable portions by receiving an output signal outputted from a drive element placed in a non-drive state under a state in which any one of the plurality of piezoelectric elements is driven, the inertial force adjusting device also being configured and positioned to effect inertial force adjustment so that the difference in inertial force between the plurality of movable portions is decreased on the basis of a detection output of the detected difference. In this drive stage, the inertial force adjusting device may preferably be an amplification factor setting device for setting and outputting an amplification factor by receiving the output signal.

According to a further aspect of the present invention, there is provided a scanning probe apparatus for obtaining formation of a sample, recording information in the sample, and processing the sample, the scanning probe apparatus comprising:

any one of the above described drive stage configured and positioned to drive a probe relative to the sample.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Hereinbelow, embodiments of the present invention will be described based on Embodiments 1-4 with reference to the drawings. As a drive element used in the present invention, a piezoelectric element of a stack type or a cylindrical type which is an electromechanical transducer may preferably be used. The cylindrical piezoelectric element is not limited to those shown in, e.g., FIGS. 3 and 8 but may also be such an assembly that a piezo crystal is separated into adjacent electrodes.

Embodiment 1

A drive stage in Embodiment 1 of the present invention will be described.

Figure 1:
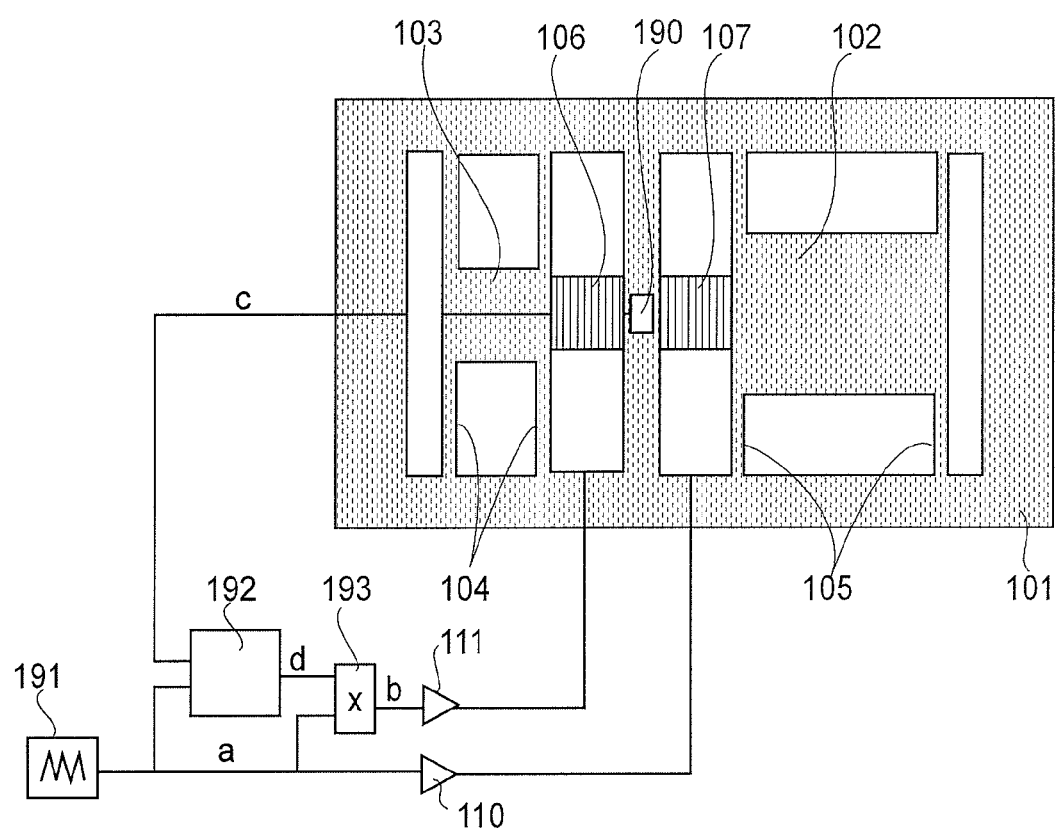
FIG. 1 is a schematic view for illustrating a constitution of a drive stage in Embodiment 1 of the present invention.

FIG. 1 is a schematic view for illustrating a constitution of the drive stage of this embodiment. As shown in FIG. 1, the drive stage includes a supporting member 101. Inside the supporting member 101, movable tables 102 and 103 as a plurality of movable portions and are fixedly supported by four parallel hinge springs 104 and four parallel hinge springs 105, respectively, so as to be movable in a horizontal direction. Further, each of piezoelectric elements 106 and 107 as a drive element is connected to the supporting member 101 at one end and connected to the movable table 102 or 103 at the other end. These two piezoelectric elements 106 and 107 have been subjected to polarization so that a length of each piezoelectric element is extended in a longitudinal direction of the supporting member 101 under application of a voltage.

In this embodiment, an inertial force adjusting device configured and positioned to effect inertial force adjustment so that a difference in inertial force between the plurality of movable portions is decreased on the basis of a detection output of an inertial force difference detecting device is constituted as follows.

At a position close to connection positions between the piezoelectric element 106 and the supporting member 101 and between the piezoelectric element 107 and the supporting member 101, an acceleration sensor 190 such as a gyro for detecting acceleration at least in one direction is disposed. This acceleration sensor 190 is the inertial force difference detecting device for detecting the difference in inertial force between the plurality of movable portions and detects the difference in inertial force between the plurality of movable portions by detecting acceleration of the supporting member 101 caused due to vibration of the supporting member 101 during the drive of drive elements.

A drive signal generating device 191 such as a signal generating circuit generates a drive signal a. The drive signal a generated by the drive signal generating device 191 is amplified by an amplifier 110 to drive the piezoelectric element 107. The drive signal a is outputted as a multiplier output b by being multiplied by an output d of an amplification factor setting device 192 in a multiplier 193. The amplification factor setting device 192 and the multiplier 193 constitute the inertial force adjusting device. The multiplier output b is amplified by an amplifier 111 to drive the piezoelectric element 106. The amplification factor setting device 192 sets and outputs an amplification factor on the basis of the drive signal a and an output c of the acceleration sensor 190.

As described above, the inertial force adjusting device is constituted so that the amplification factor of the drive signal for driving the movable portions is adjustable depending on the difference in inertial force between the plurality of movable portions. Based on this constitution, an inertial force of at least one of the movable portions is adjusted depending on the difference in inertial force between the plurality of movable portions so as to decrease the inertial force difference.

Next, an operation of the drive stage of this embodiment will be described.

Figure 2:
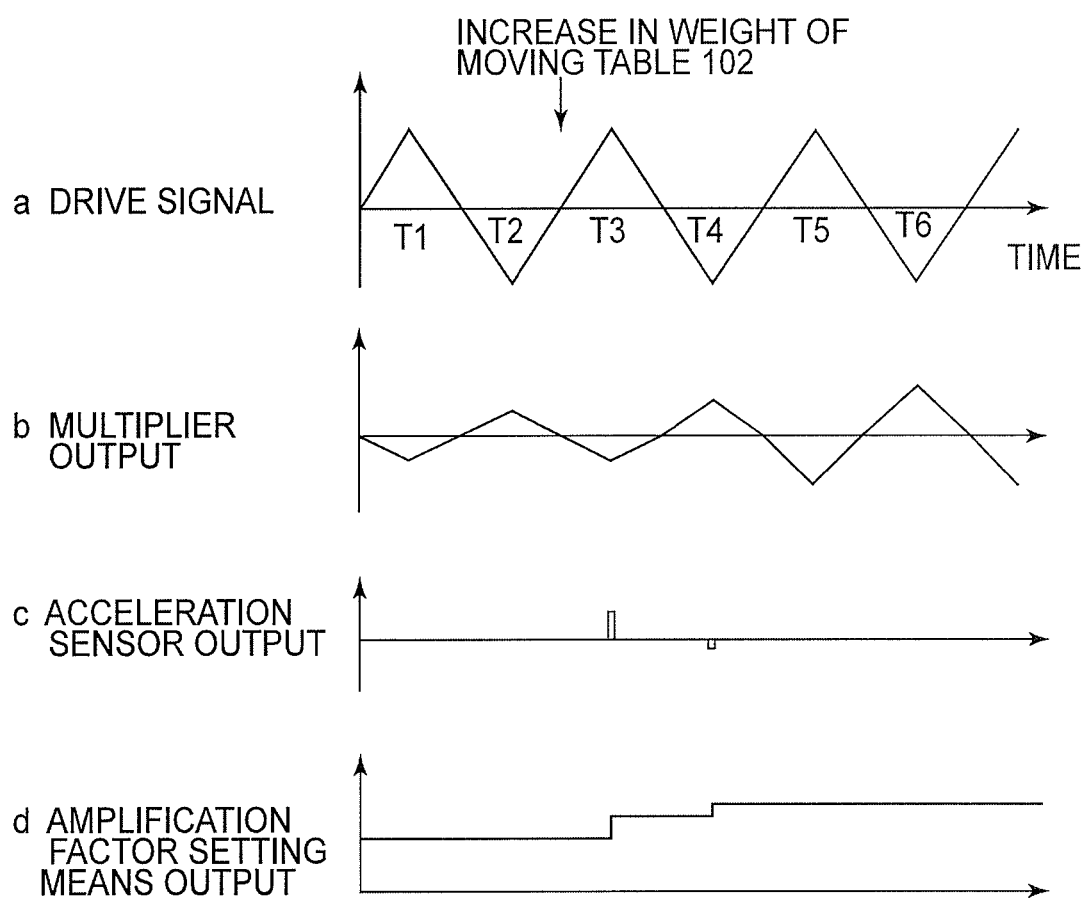
FIG. 2 includes time charts of respective signals (outputs) for illustrating an operation of the drive stages in Embodiment 1 of the present invention.

FIG. 2 includes time charts of respective signals (outputs) for illustrating the operation of the drive stage of this embodiment.

In FIG. 2, a stage drive signal a is a sawtooth waveform by which the movable table 102 is reciprocated. The drive signal a is generated from an unshown signal generating circuit.

At an initial stage, an output d of the amplification factor setting device 192 constituted by an analog electronic circuit or the like is set at a value so that inertial forces of the movable tables 102 and 103 are mutually canceled. For this reason, an output c of the acceleration sensor 190 is zero.

As shown in FIG. 2, between periods (of time) T2 and T3, assuming that a mass of one the movable tables (movable table 102 in this embodiment) is increased by replacement or the like of a sample mounted on the movable table 102, acceleration generated during switching in movement direction of the movable table 102 at the period T2 is increased. As a result, the inertial forces cannot be canceled, so that the output c of the acceleration sensor 190 is increased. Based on this value of the acceleration sensor output c and a corresponding value of the drive signal a, the amplification factor setting device 192 sets an amplification factor again. More specifically, in this embodiment, the acceleration is generated to increase a reaction force, so that the setting is performed again so that the amplification factor is increased to cancel the reaction force. In a subsequent period T4, acceleration is generated, so that the amplification factor setting device 192 sets an amplification factor again so as to increase the amplification factor previously set. By the above described operation, the amplification factor is properly set again, so that there is no output of the acceleration sensor in a subsequent period T5 and later periods.

In this embodiment, such a constitution that the reaction force is increased by the increase in mass of the movable table is described as an example. However, the reaction force is decreased when the mass is decreased depending on a type or the like of the sample. Further, there is a possibility that the reaction force can be increased or decreased by a change or the like in characteristic of the piezoelectric element. According to this embodiment, it is also possible to properly set the amplification factor again with respect to these changes.

In the drive stage of this embodiment, the two movable tables are used to constitute a movable table to be driven. It is also possible to use either one or both of the two movable tables as a sample table. Further, the drive stage of this embodiment is driven in a direction in which the movable tables 102 and 103 face each other and so that the inertial forces are equal to each other. As a result, the inertial forces transmitted to the supporting member 101 are mutually canceled.

For this reason, it is possible to provide a drive stage causing less vibration even when high-speed scanning is performed. Further, the amplification factor setting device 192 sets the amplification factor on the basis of the output of the acceleration sensor 190 and the drive signal, so that it is possible to provide a drive stage with no increase in vibration even when the mass of the drive stage is increased. Further, it is possible to provide a drive stage with no increase in vibration even when the characteristic of the piezoelectric element is changed with time or the like.

In any of this embodiment and Embodiments described later in the present invention, the setting operation of the amplification factor may also be performed by controlling a timing of setting operation start by a control circuit such as a central processing unit (CPU) so that the setting operation is started in response to turning on of a correction switch or a power switch of a main assembly of a scanning probe apparatus.

For example, the setting operation is started after a drive stage replaceable mountable to the scanning probe apparatus main assembly is replaced with a new drive stage. More specifically, when the correction switch or the power switch is turned on, the drive signal generating device and the inertial force adjusting device are actuated.

As described above, the difference in inertial force between the plurality of movable portions is detected and on the basis of a detection output of the detected difference, an adjusting function of the inertial force adjusting device is performed so as to decrease the difference in inertial force between the plurality of movable portions. This function may also be performed plural times is total not only in the turning-on period of the correction switch or the power switch but also at an appropriate time interval during the operation of the scanning probe apparatus.

Embodiment 2

Figure 3:
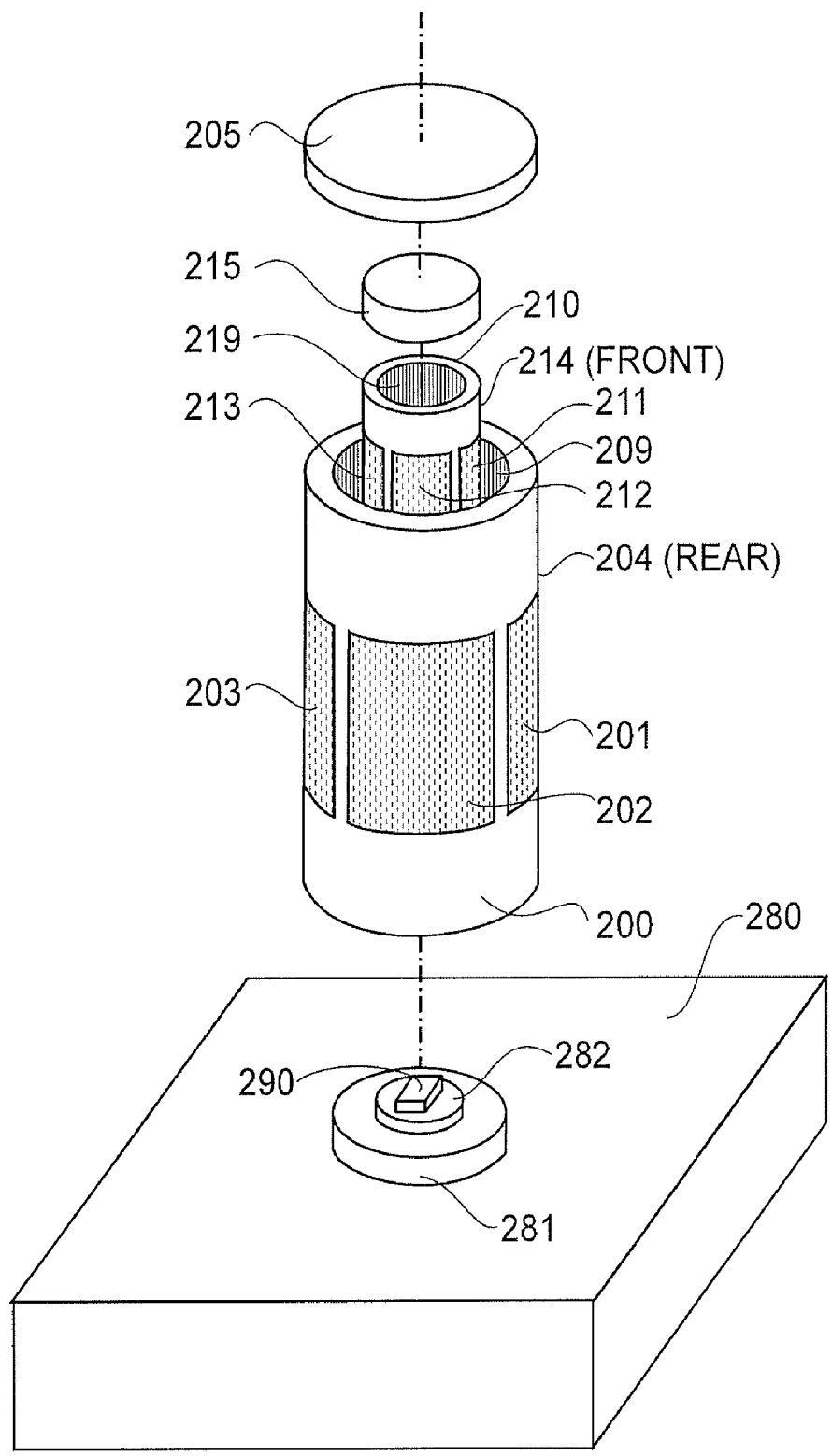
FIG. 3 is a schematic view for illustrating a constitution of a drive stage in Embodiment 2 of the present invention.

In Embodiment 2, a drive stage different in shape from that of Embodiment 1 will be described with reference to FIG. 3 showing a perspective view of the drive stage of this embodiment.

As shown in FIG. 3, the drive stage of this embodiment has such a structure that two cylindrical piezoelectric elements as drive elements are concentrically disposed. More specifically, inside a first cylindrical piezoelectric element 200, a second cylindrical piezoelectric element 210 is concentrically disposed. This state is shown in FIG. 3 as an exploded view. Around the first cylindrical piezoelectric element 200, divided four electrodes 201 to 204 are disposed. The electrode 204 is located on a rear side. At an inner peripheral surface of the first cylindrical piezoelectric element 200, a common electrode 209 is disposed. At an upper portion of the first cylindrical piezoelectric element 200, a movable table 205 as a movable portion is connected (but shown in FIG. 3 in an exploded state). At a lower portion, the first cylindrical piezoelectric element 200 is connected and fixed on a supporting member 280 through piezoelectric element fixing portions 281 and 282. Further, around the second cylindrical piezoelectric element 210, divided four electrodes 211 to 214 are disposed. The electrode 214 is located on a rear side. At an inner peripheral surface of the second cylindrical piezoelectric element 210, a common electrode 219 is disposed. At an upper portion of the second cylindrical piezoelectric element 210, a weight 215 as a movable portion is connected (but shown in FIG. 3 in an exploded state). At a lower portion, the second cylindrical piezoelectric element 210 is connected and to the supporting member 280 through the piezoelectric element fixing portions 281 and 282.

At the piezoelectric element fixing portion 282, a travail acceleration sensor 290 capable of measuring acceleration values with respect to X, Y and Z axes mutually intersecting at right angles is disposed. This triaxial acceleration sensor 290 is an inertial force difference detecting device for detecting the difference in inertial force between the plurality of movable portions. In this embodiment, the difference in inertial force between the plurality of movable portions is detected by detecting acceleration of the supporting member (supporting portion) caused due to vibration of the supporting member during drive of the drive elements. An output of the triaxial acceleration sensor 290 is inputted into an amplification factor setting device 292 (shown in FIG. 4).

The amplification factor setting device 292 functions, similarly as in the case of the amplification factor setting device 192 in Embodiment 1, a device for setting amplification factors Ax, Ay and Az so that inertial forces in three axis directions are canceled on the basis of three output signals from the triaxial acceleration sensor 290 and three drive signals x, y and z. Three multipliers 293, 294 and 295 and the amplification factor setting device 292 constitute an inertial force adjusting device. The inertial force adjusting device adjusts an inertial force of at least one of the movable portions depending on the difference in inertial force between the plurality of movable portions so as to decrease the inertial force difference.

The first and second piezoelectric elements 200 and 210 have the common electrodes 209 and 219, respectively, electrically connected to the ground and control voltages applied to opposite two electrodes (201 and 203, 202 and 204, 211 and 213, and 212 and 214). As a result, the first and second cylindrical piezoelectric elements 200 and 210 can be bent so that one of the two electrodes is expanded and the other electrode is contracted. Further, it is also possible to expand and contrast each of the cylindrical piezoelectric elements in a long axis direction by applying the same voltage to the divided four electrodes. In short, the bending and the expansion and contraction of the cylindrical piezoelectric elements 200 and 210 can be controlled by voltages applied to the respective electrodes.

Therefore, it is possible to three-dimensionally drive the movable table 205 and the weight 215 disposed at the upper (top) portions of the cylindrical piezoelectric elements.

Figure 4:
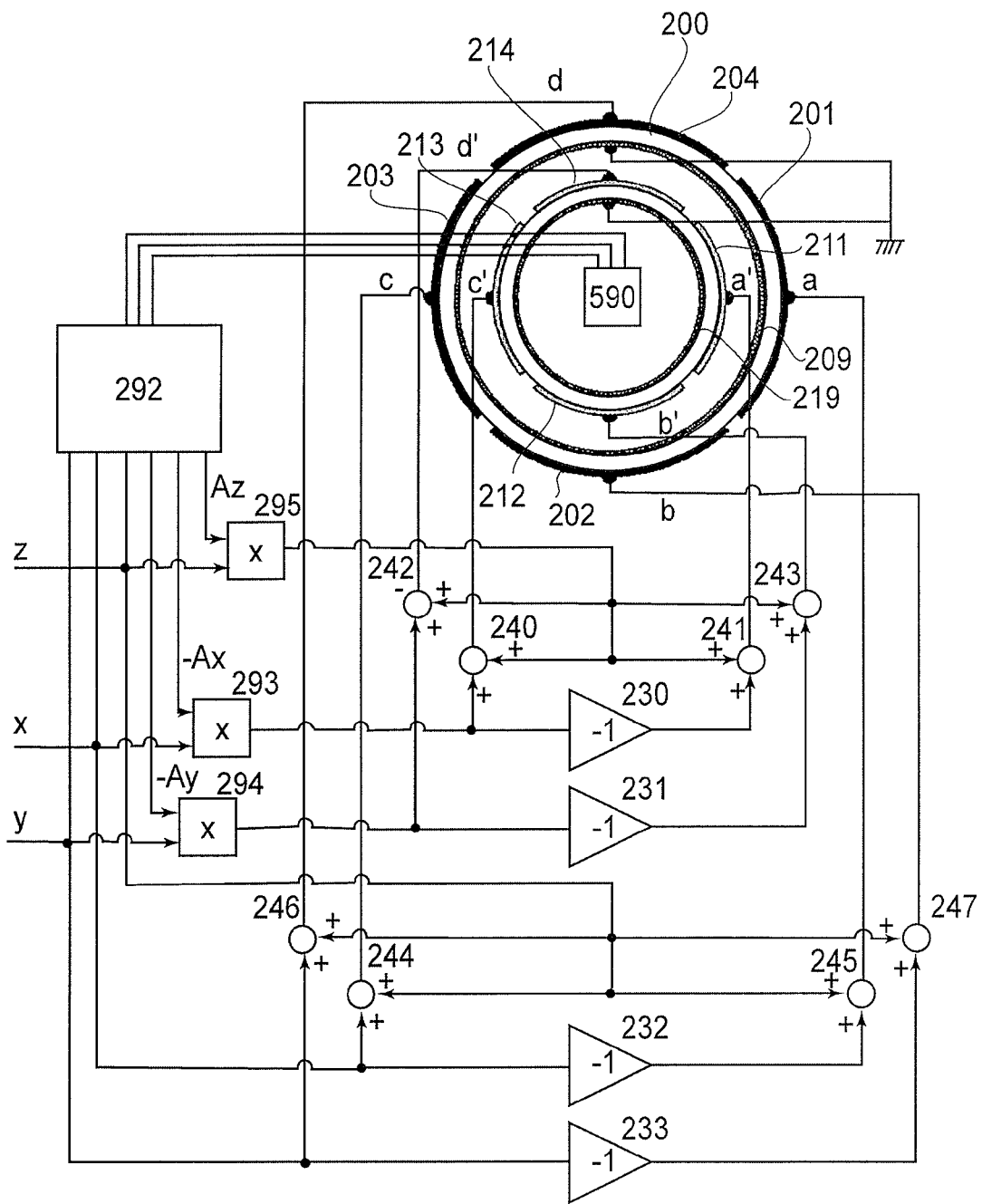
FIG. 4 is a schematic view showing wiring for the drive stage in Embodiment 2 of the present invention.

FIG. 4 is a wiring diagram for the drive stage of this embodiment.

In a wiring state shown in FIG. 4, a relationship between the drive signals x, y and z and voltages applied to the respective electrodes is represented by the following formula:

$$\begin{bmatrix} a \\ b \\ c \\ d \\ a' \\ b' \\ c' \\ d' \end{bmatrix} = \begin{bmatrix} 1 & & 1 \\ & 1 & 1 \\ -1 & & 1 \\ & -1 & 1 \\ A_x & & A_z \\ & A_y & A_z \\ A_x & & A_z \\ & -A_y & A_z \end{bmatrix} \begin{bmatrix} X \\ Y \\ Z \end{bmatrix}$$

In the above formula, a to d represent voltages applied to the electrodes 201 to 204, respectively; a' to d' represent voltages applied to the electrodes 211 to 214, respectively; and X, Y and Z represent voltages of the drive signals x, y and z, respectively.

Figure 5:
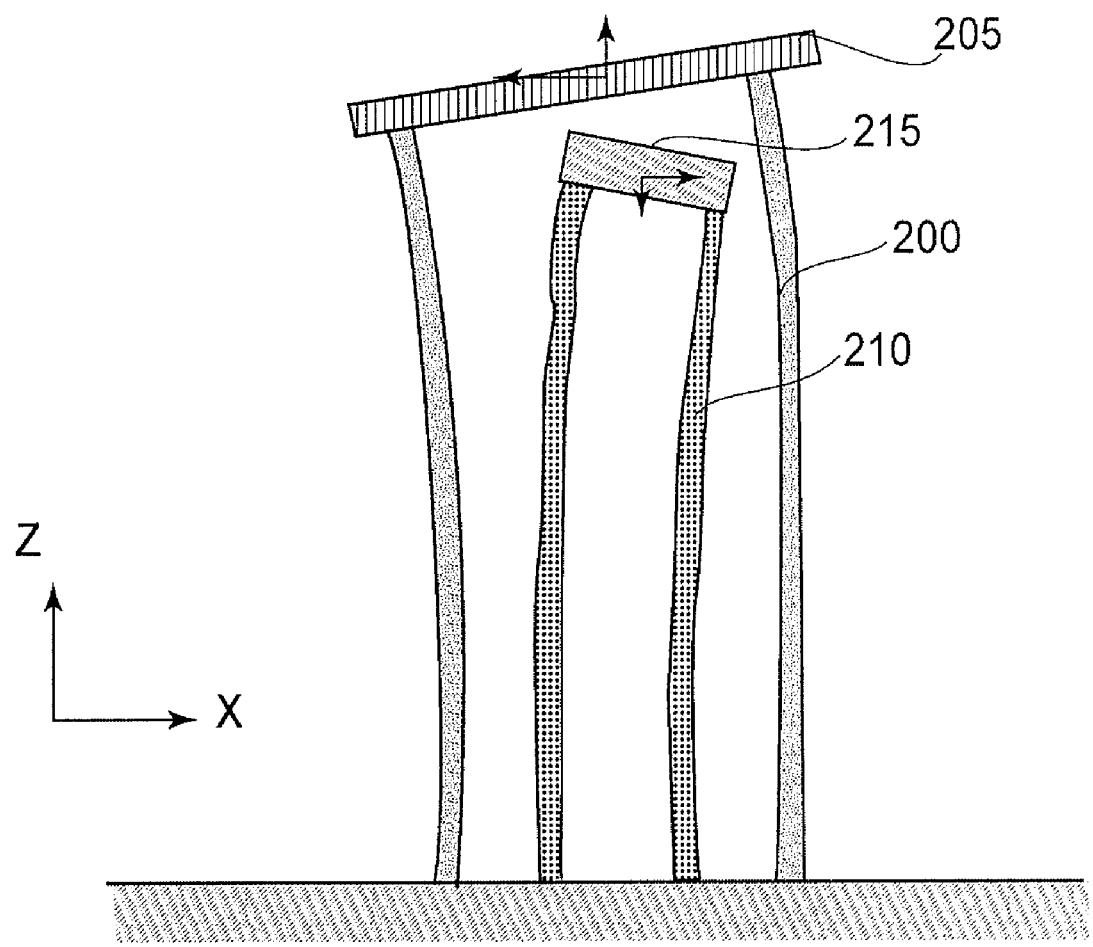
FIG. 5 is a schematic view for illustrating an operation of the drive stage in Embodiment 2 of the present invention.

FIG. 5 is a schematic sectional view showing a behavior of deformation of the cylindrical piezoelectric elements. In FIG. 5, the cylindrical piezoelectric element 200 is bent and expanded toward an upper left direction, and the cylindrical piezoelectric element 210 is bent and contracted toward a lower right direction. The amplification factors Ax, Ay and Az are set to mutually cancel inertial forces generated with respect to the cylindrical piezoelectric elements 200 and 210.

According to this embodiment, even when the mass of the drive portion or the characteristic of the piezoelectric element is changed, it is possible to drive the drive stage in a state in which the inertial forces with respect to the plurality of movable portions are always mutually canceled by detecting the acceleration of the supporting portion by means of the acceleration sensor 290 and appropriately setting the amplification factors by means of the amplification factor setting device 292.

Embodiment 3

Figure 6:
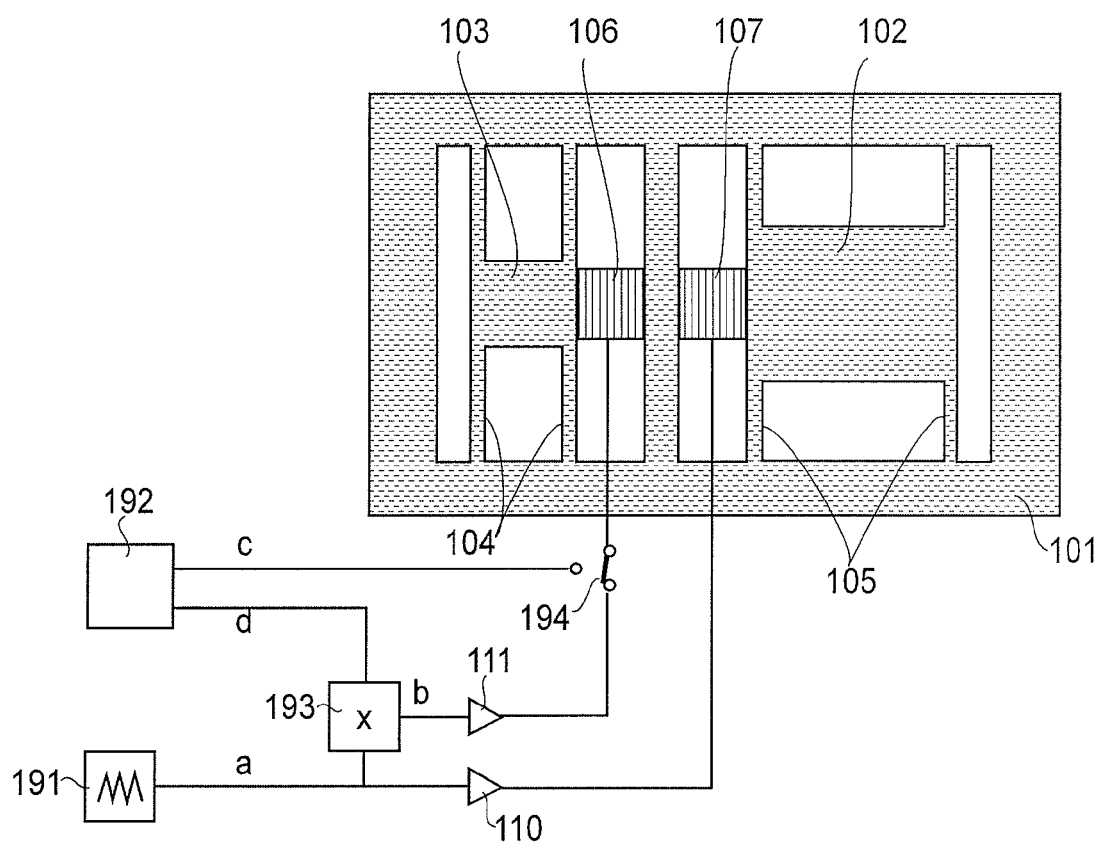
FIG. 6 is a schematic view for illustrating a constitution of a drive stage in Embodiment 3 of the present invention.

FIG. 6 is a schematic view for illustrating a constitution of a drive stage of Embodiment 3 of the present invention. As shown in FIG. 6, the drive stage includes a supporting member 101. Inside the supporting member 101, movable tables 102 and 103 as a plurality of movable portions and are fixedly supported by four parallel hinge springs 104 and four parallel hinge springs 105, respectively, so as to be movable in a horizontal direction. Further, each of piezoelectric actuators 106 and 107 as a drive element is connected to the supporting member 101 at one end and connected to the movable table 102 or 103 at the other end. These two piezoelectric actuators 106 and 107 have been subjected to polarization so that a length of each piezoelectric element is extended in a longitudinal direction of the supporting member 101 under application of a voltage.

In this embodiment, an inertial force adjusting device which is configured and positioned to detect a difference in inertial force between said plurality of movable portions by receiving an output signal outputted from a drive element placed in a non-drive state under a state in which any one of said plurality of piezoelectric elements is driven and which is also configured and positioned to effect inertial force adjustment so that a difference in inertial force between the plurality of movable portions is decreased on the basis of a detection output of an inertial force difference detecting device is constituted as follows.

In this embodiment, in a drive signal generating device 191, a drive signal a is generated. The drive signal a, generated by the drive signal generating device 191 is amplified by an amplifier 110 to drive the piezoelectric actuator 107. The drive signal a is outputted as a multiplier output b by being multiplied by an output d of an amplification factor setting device 192 in a multiplier 193. The multiplier output b is amplified by an amplifier 111 to drive the piezoelectric actuator 106. The amplification factor setting device 192 sets and outputs an amplification factor on the basis of a voltage generated in the piezoelectric actuator 106 when the piezoelectric actuator 106 is not driven. A switch 194 electrically connects either one of the multiplier 111 and the amplification factor setting device 192 to the piezoelectric actuator 106.

Figure 7:
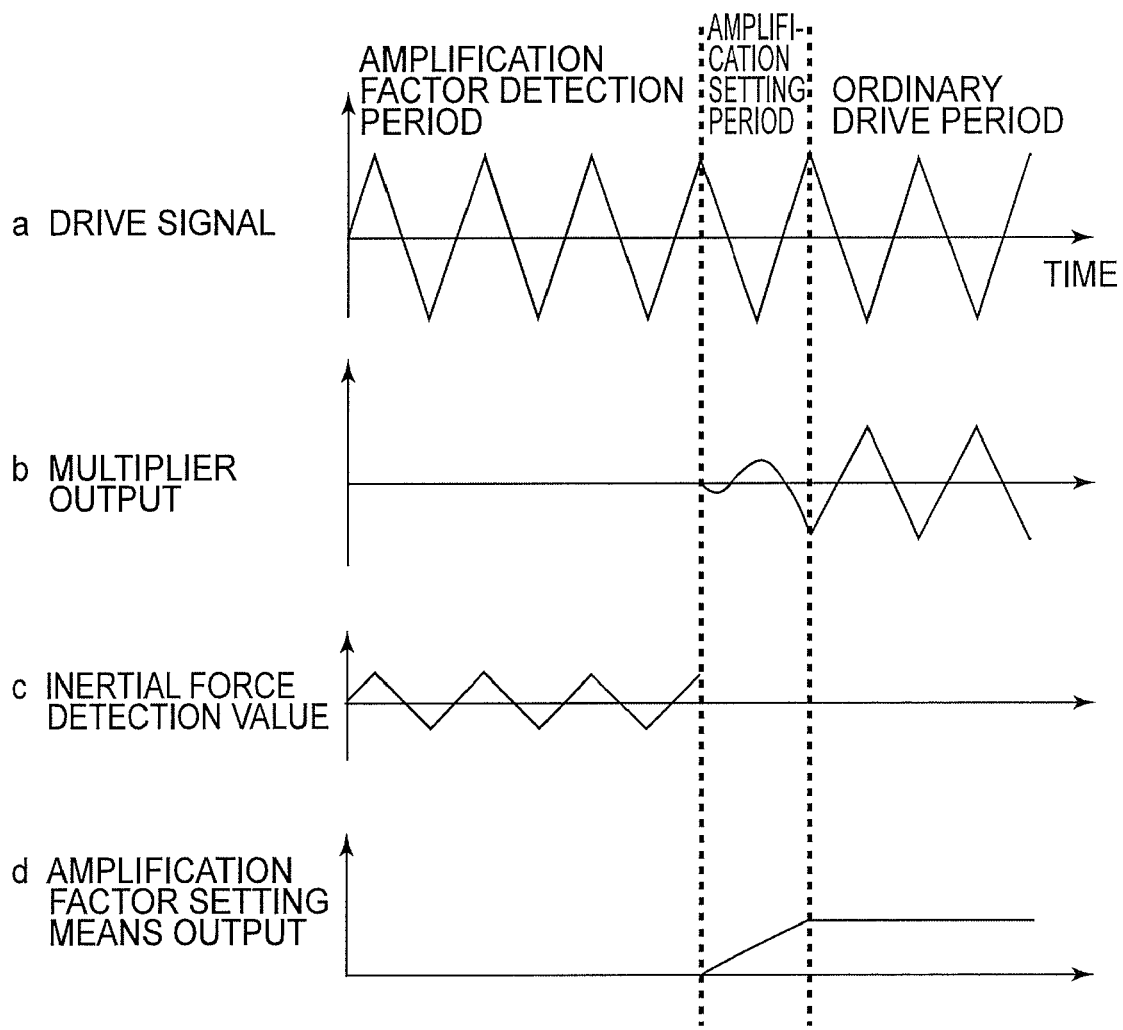
FIG. 7 includes time charts of respective signals (outputs) for illustrating an operation of the drive stages in Embodiment 3 of the present invention.

Next, an operation of the drive stage of this embodiment will be described more specifically with reference to FIG. 7 showing time charts of respective signals (outputs).

The stage drive signal a is such a sawtooth wave that the movable table is reciprocated. Initially, a setting value of the multiplier 193 is zero and the piezoelectric actuator 106 is electrically connected to the amplification factor setting device 192. A reaction force by movement of the movable table 102 and an object mounted on the movable table 102 causes movement of the movable table 103 through the supporting member 101. As a result, a voltage is generated in the piezoelectric actuator 106 which is expanded contracted, so that the voltage is detected by the amplification factor setting device 192 as a detection value c. Depending on the detection value c, an amplification factor for canceling the movement of the movable table 102 and the object mounted thereon is determined. Next, the piezoelectric actuator 106 is electrically connected to the amplifier 111, and the amplification factor setting device 192 gradually increases the setting value of the multiplier 193 to a value equal to the above described amplification factor. In this manner, by gradually changing the amplification factor, it is possible to prevent structural or mechanical damage to the piezoelectric actuator 106 due to abrupt voltage application. A similar effect can also be achieved by effecting the setting of the amplification factor at the time when the stage drive signal is zero or after the stage drive signal is once stopped.

The drive stage of this embodiment has two movable tables. Either one or both of the movable tables may be used. The drive stage of this embodiment constituted as described above is driven in a direction in which the movable tables 102 and 103 face each other and so that the inertial forces are equal to each other. As a result, the inertial forces transmitted to the supporting member 101 by which the movable tables are movably fixed and supported are mutually canceled.

For this reason, it is possible to provide a drive stage causing less vibration even when high-speed scanning is performed. Further, the amplification factor setting device 192 sets the amplification factor on the basis of the inertial force generated with respect to one movable table as a result of the drive of the other movable table, so that it is possible to provide a drive stage with no increase in vibration even when the mass of the mounted object is increased.

Embodiment 4

FIG. 3 showing a perspective view of a drive stage of Embodiment 4.

Figure 8:
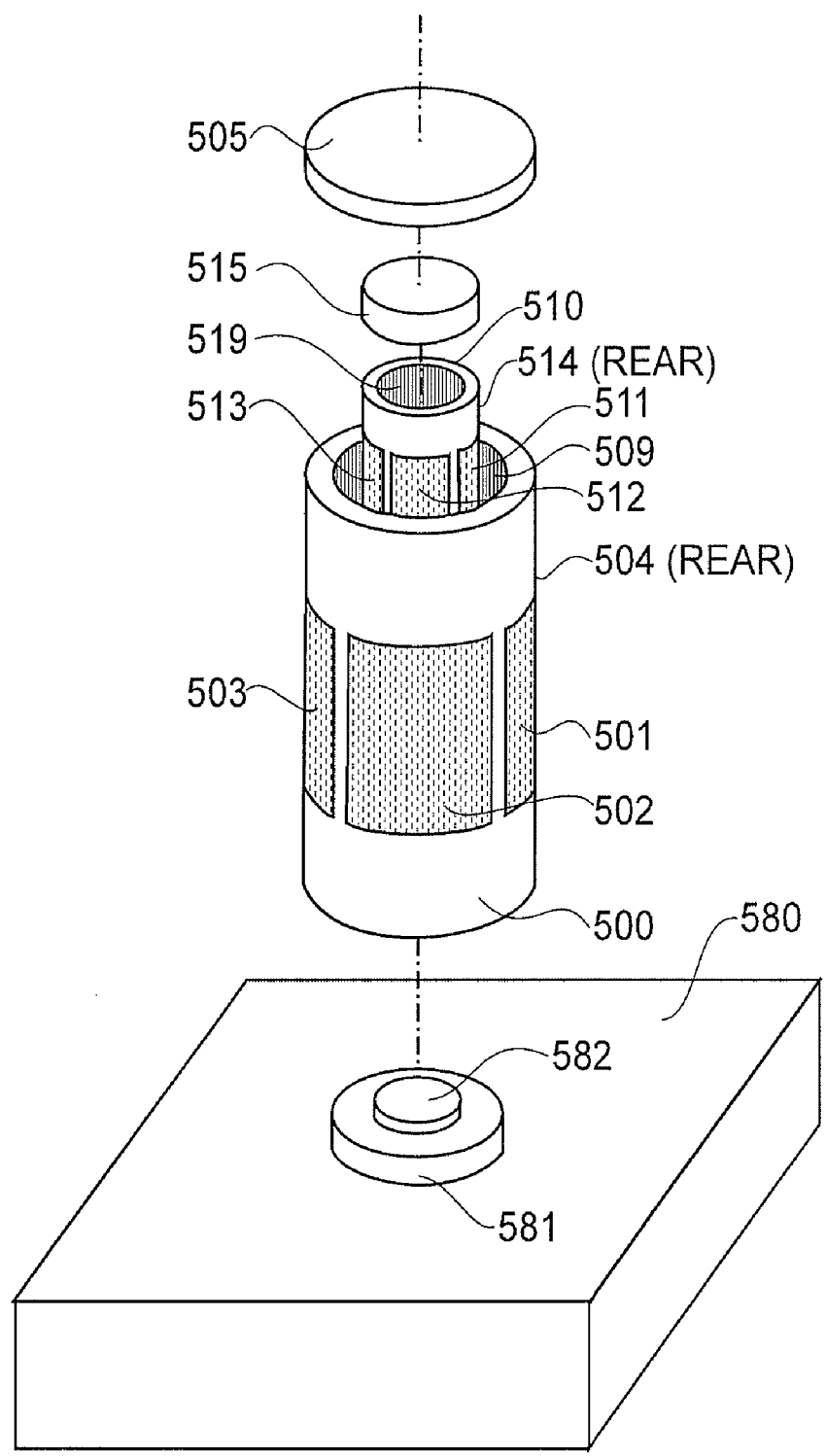
FIG. 8 is a schematic view for illustrating a constitution of a drive stage in Embodiment 4 of the present invention.

As shown in FIG. 8, the drive stage of this embodiment has such a structure that two cylindrical piezoelectric elements are concentrically disposed. More specifically, inside a first cylindrical piezoelectric element 500, a second cylindrical piezoelectric element 510 is concentrically disposed. This state is shown in FIG. 8 as an exploded view. Around the first cylindrical piezoelectric element 500, divided four electrodes 501 to 504 are disposed. The electrode 504 is located on a rear side. At an inner peripheral surface of the first cylindrical piezoelectric element 500, a common electrode 209 is disposed. At an upper portion of the first cylindrical piezoelectric element 500, a movable table 505 is connected (but shown in FIG. 8 in an exploded state). At a lower portion, the first cylindrical piezoelectric element 500 is connected and fixed on a supporting member 580 through a piezoelectric element fixing portion 581. Further, around the second cylindrical piezoelectric element 510, divided four electrodes 511 to 514 are disposed. The electrode 514 is located on a rear side. At an inner peripheral surface of the second cylindrical piezoelectric element 510, a common electrode 519 is disposed. At an upper portion of the second cylindrical piezoelectric element 510, a weight 515 is connected (but shown in FIG. 8 in an exploded state). At a lower portion, the second cylindrical piezoelectric element 510 is connected and to the supporting member 580 through a piezoelectric element fixing portion 582.

The first and second piezoelectric elements 500 and 510 have the common electrodes 509 and 519, respectively, electrically connected to the ground and control voltages applied to opposite two electrodes (501 and 503, 502 and 504, 511 and 513, and 512 and 514). As a result, the first and second cylindrical piezoelectric elements 500 and 510 can be bent so that one of the two electrodes is expanded and the other electrode is contracted. Further, it is also possible to expand and contrast each of the cylindrical piezoelectric elements in a long axis direction by applying the same voltage to the divided four electrodes. In short, the bending and the expansion and contraction of the cylindrical piezoelectric elements 500 and 510 can be controlled by voltages applied to the respective electrodes.

Therefore, it is possible to three-dimensionally drive the movable table 505 and the weight 515 disposed at the upper (top) portions of the cylindrical piezoelectric elements.

Figure 9:
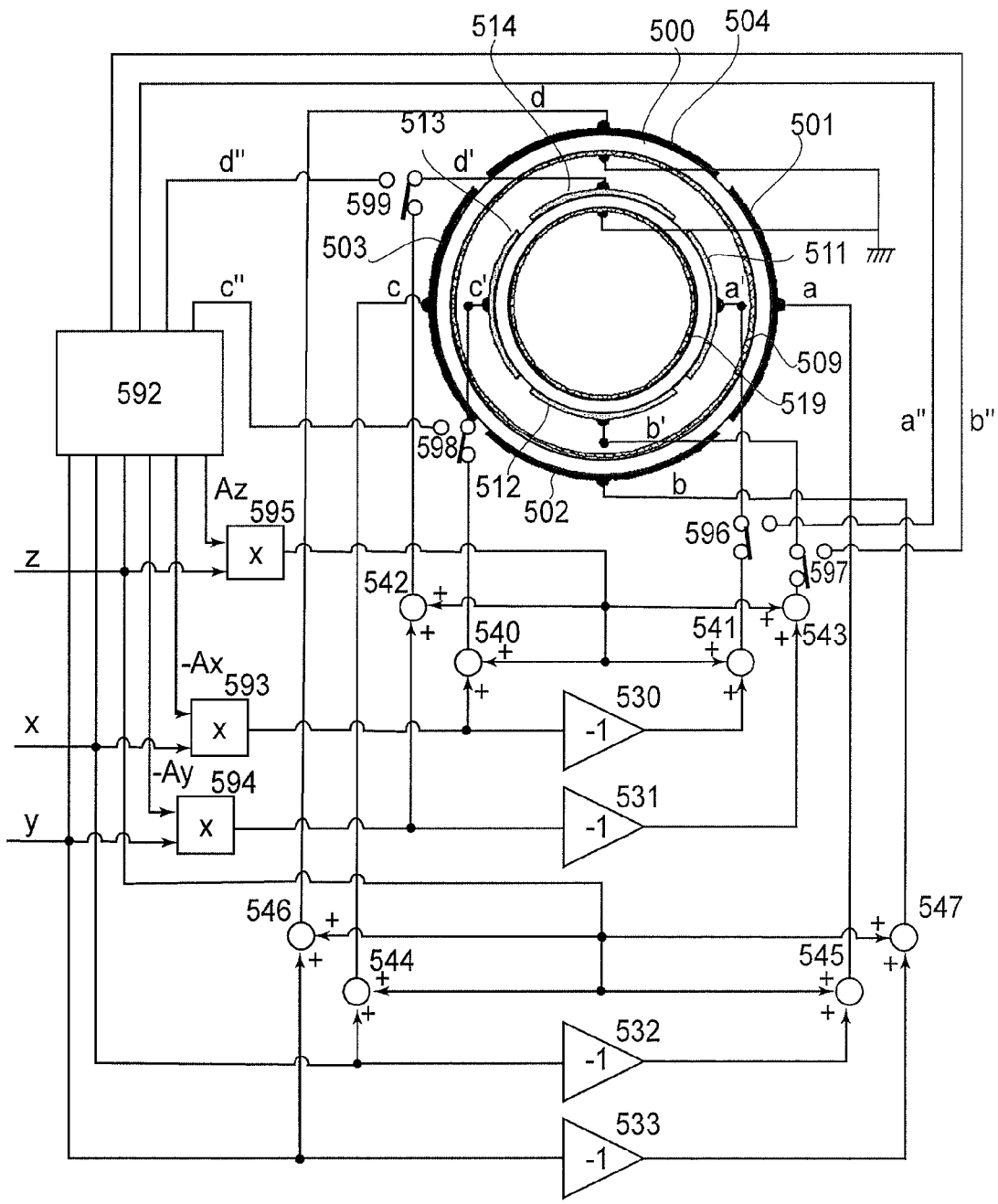
FIG. 9 is a schematic view showing wiring for the drive stage in Embodiment 4 of the present invention.

FIG. 9 is a wiring diagram for the drive stage of this embodiment.

In a wiring state shown in FIG. 9, a relationship between the drive signals x, y and z and voltages applied to the respective electrodes is represented by the following formula:

$$\begin{bmatrix} a \\ b \\ c \\ d \\ a' \\ b' \\ c' \\ d' \end{bmatrix} = \begin{bmatrix} 1 & & 1 \\ & 1 & 1 \\ -1 & & 1 \\ & -1 & 1 \\ A_x & & A_z \\ & A_y & A_z \\ A_x & & A_z \\ & -A_y & A_z \end{bmatrix} \begin{bmatrix} X \\ Y \\ Z \end{bmatrix}$$

In the above formula, a to d represent voltages applied to the electrodes 501 to 504, respectively; a' to d' represent voltages applied to the electrodes 511 to 514, respectively; and X, Y and Z represent voltages of the drive signals x, y and z, respectively.

Figure 10:
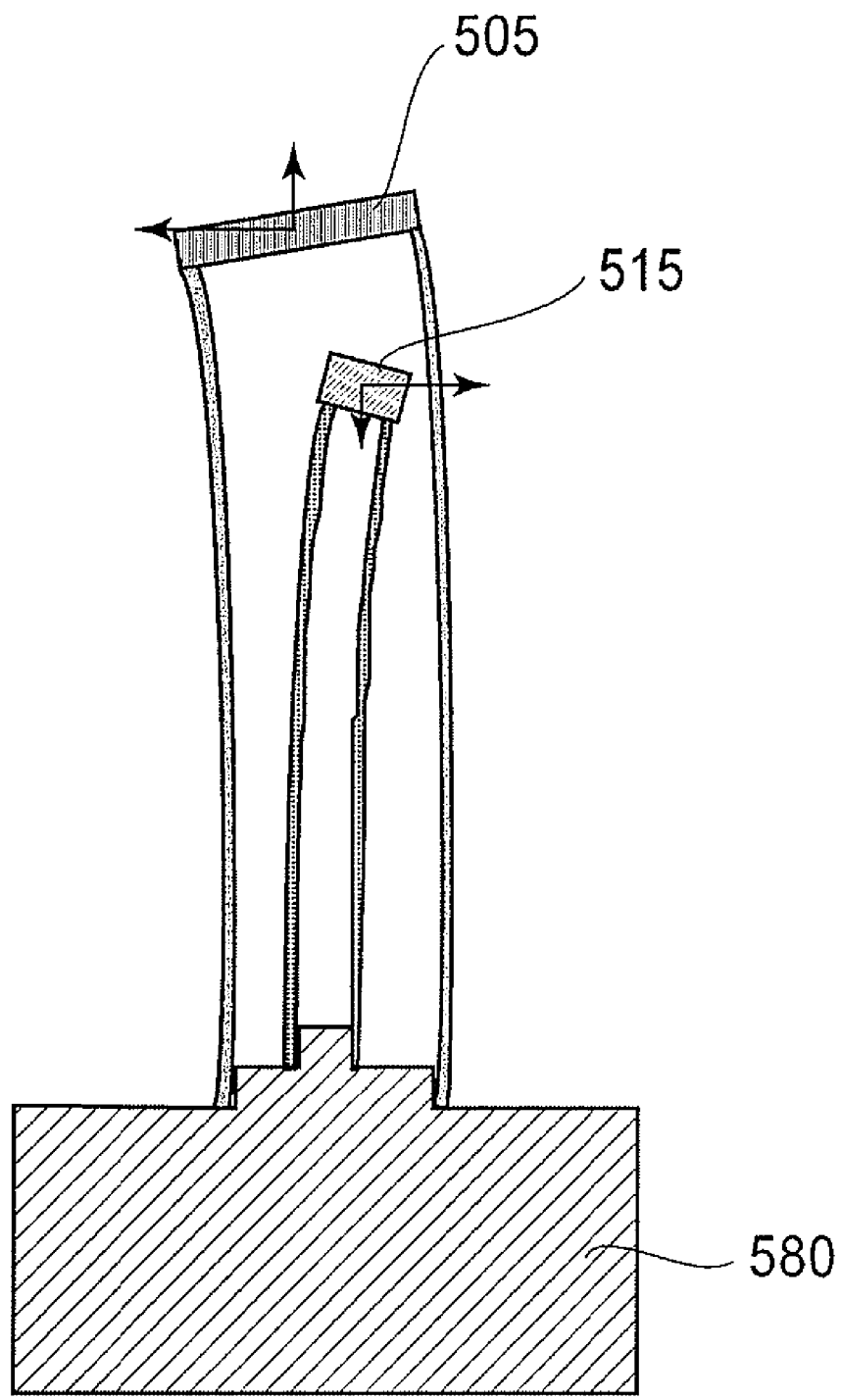
FIG. 10 is a schematic view for illustrating an operation of the drive stage in Embodiment 4 of the present invention.
Figure 11:
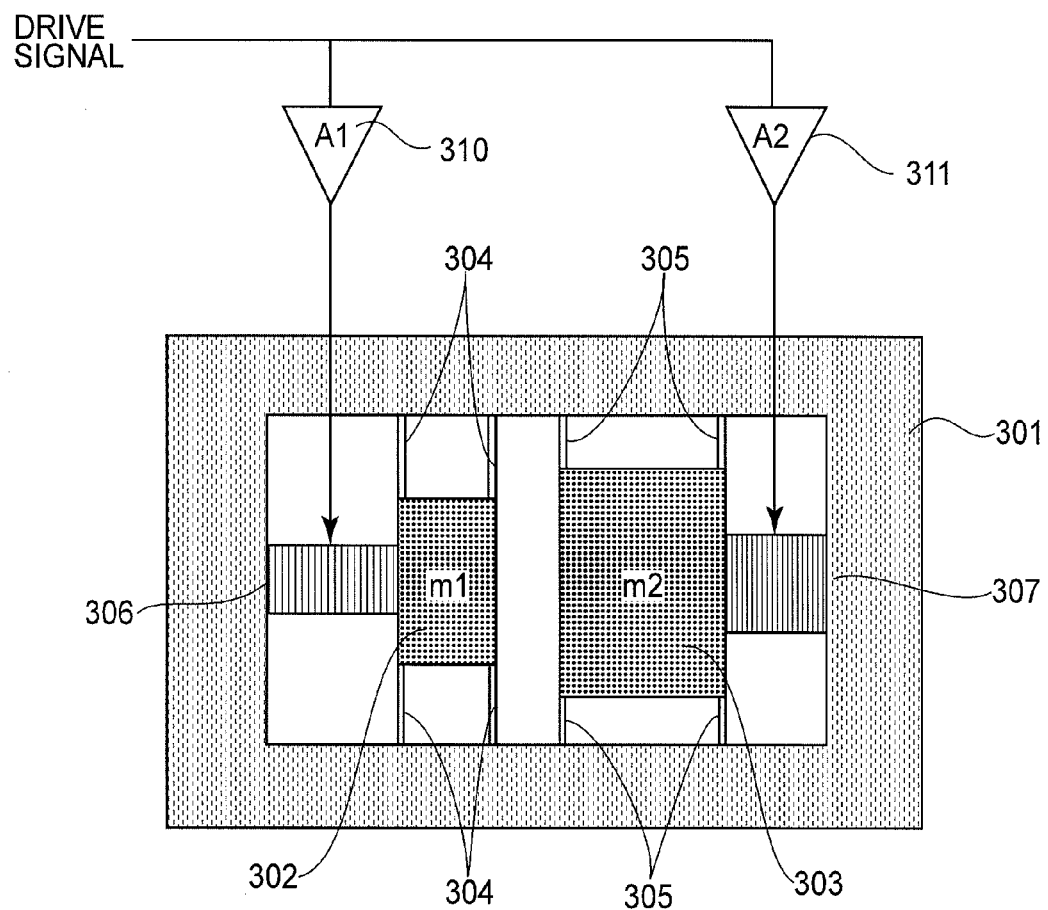
FIG. 11 is a schematic view for illustrating a constitution of a drive stage in a conventional scanning probe apparatus.

FIG. 10 is a schematic sectional view showing a behavior of deformation of the cylindrical piezoelectric elements. In FIG. 10, the cylindrical piezoelectric element 500 is bent and expanded toward an upper left direction, and the cylindrical piezoelectric element 510 is bent and contracted toward a lower right direction. The amplification factors Ax, Ay and Az are set to mutually cancel inertial forces generated with respect to the cylindrical piezoelectric elements 500 and 510.

The amplification factor setting device 592 functions, similarly as in the case of the amplification factor setting device 192 in Embodiment 1, a device for computing and setting amplification factors Ax, Ay and Az from three drive signals x, y and z, so that inertial forces in three axis directions are canceled on the basis of the voltage generated in the first piezoelectric element 510 during the non-drive of the first piezoelectric element 510. Further, switching of connection portions of the electrodes 511 to 514 by switches 596 to 599 is performed in the same manner as in Embodiment 1.

When voltages applied to the electrodes 511 to 514 are taken as a", b", c" and d", respectively, these voltage values can be divided into the following three components.

$$Sz=(a''+c'')/2$$

$$Sx=Sz-a''$$

$$Sy=Sz-b''$$

These three components Sx, Sy and Sz are components for the drive signals x, y and z, respectively. By multiplying these components by an appropriate constant, it is possible to provide amplification factors Ax, Ay and Az.

Incidentally, a combination of the voltage values used is appropriately selectable in the present invention. Further, in order to improve accuracy by averaging (method), it is also possible to use four or more voltage values in combination. Further, the computation may also be performed on the basis of the circuit as in the case of the above described drive signals.

According to the present invention, it is possible to appropriately set the amplification factor by the amplification factor setting device 592 on the basis of the voltage generated in the second cylindrical piezoelectric element 502. Accordingly, even in the case where the mass of the drive portion is changed or the first piezoelectric element 500 is replaced, it is possible to drive the drive stage in a state in which the inertial forces are always mutually canceled. Therefore, it is possible to provide a drive stage with less occurrence of vibration even when the drive stage with less occurrence of vibration even when the drive stage is driven at high speed.

By applying any of the above described drive stages of the respective Embodiments for driving the probe relative to the sample to a scanning probe apparatus, it is possible to realize a scanning probe microscope (SPM) capable of obtaining a clear image at high speed. Further, it is also possible to realize an information record reproduction apparatus with less occurrence of an error caused due to the vibration even when high-speed record reproduction of information is effected and to realize a processing apparatus or the like which does not lower accuracy even when high-speed processing is effected.

Further, the drive stage of the present invention can be used as not only a drive stage for a sample which is mounted to a movable portion and subjected to scanning movement with respect to a probe but also a drive stage for a probe which is mounted to a movable portion and subjected to scanning movement with respect to a sample.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 137309/2006 filed May 17, 2006, and 038885/2007 filed Feb. 20, 2007, which is hereby incorporated by reference.

What is claimed is:

1. A drive stage for a scanning probe apparatus, comprising:
    a supporting member;
    a pair of movable portions, fixed to said supporting member, capable of mutually canceling inertial forces thereof;
    a pair of piezoelectric elements for driving said pair of movable portions, wherein said drive stage is driven in a direction in which inertial forces of said pair of movable portions are mutually canceled during drive of said pair of piezoelectric elements; and
    an inertial force adjusting device for detecting an output voltage output from one piezoelectric element placed in a non-drive state under a state in which the other piezoelectric element is driven and for effecting inertial force adjustment so that a difference in inertial force between said pair of movable portions is decreased on a basis of a detected output voltage.

2. A drive stage according to claim 1, wherein said inertial force adjusting device includes an amplification factor setting device for setting an amplification factor by receiving an output signal and on a basis of the set amplification factor, drives the piezoelectric element which has detected the output voltage.

3. A scanning probe apparatus for obtaining formation of a sample, recording information in the sample, and processing the sample, said scanning probe apparatus comprising:
    a drive stage, according to claim 1 or 2, for driving a probe relative to the sample.

4. A drive stage according to claim 1, wherein said pair of piezoelectric elements are cylindrical piezoelectric elements one of which is provided inside the other cylindrical piezoelectric element, and
    wherein said pair of piezoelectric elements is concentrically disposed.

5. A scanning probe apparatus for obtaining formation of a sample, recording information in the sample, and processing the sample, said scanning probe apparatus comprising:
    a drive stage, according to claim 4, for driving a probe relative to the sample.

* * * * *